US011386153B1

(12) United States Patent
Greene et al.

(10) Patent No.: US 11,386,153 B1
(45) Date of Patent: Jul. 12, 2022

(54) FLEXIBLE TAGGING AND SEARCHING SYSTEM

(71) Applicant: Amazon Technologies, Inc., Seattle, WA (US)

(72) Inventors: Joseph James Greene, Seattle, WA (US); Daniel Larkin, Dublin (IE); Christopher Richard Kruse, Lynnwood, WA (US); Jason A Rhoads, Carnation, WA (US); Lance Dayton Byrd, Bremerton, WA (US); Da Wang, Seattle, WA (US); Matthew Mitgang, Seattle, WA (US); Ruchi Jiwrajka, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 328 days.

(21) Appl. No.: 16/457,614

(22) Filed: Jun. 28, 2019

(51) Int. Cl.
  *G06F 16/81* (2019.01)
  *G06F 16/901* (2019.01)
(52) U.S. Cl.
  CPC ............ *G06F 16/81* (2019.01); *G06F 16/901* (2019.01)
(58) Field of Classification Search
  None
  See application file for complete search history.

(56) References Cited

U.S. PATENT DOCUMENTS

| 2003/0069936 | A1* | 4/2003 | Warner | G06F 40/211 |
| | | | | 709/206 |
| 2009/0043789 | A1* | 2/2009 | Gupta | G06F 16/48 |
| 2015/0142720 | A1* | 5/2015 | Beechuk | G06N 5/048 |
| | | | | 706/50 |
| 2020/0159841 | A1* | 5/2020 | Tabares | G06F 16/2272 |

OTHER PUBLICATIONS

Silva, Sara, et al., "Machine learning in incident categorization automation," 2018 13th Iberian Conference on Information Systems and Technologies (CISTI), 2018, pp. 1-6 (Year: 2018).*
Fruition Partners, "Yale University Incident Management Process Guide", version 2, Jan. 2, 2012, 17 pages. (Year: 2012).*
Glaser, Nick & Kedar Zavar, "Incident Management: Getting Started with Remedyforce Series", (2015), BMC Software, Inc., 16 pages. (Year: 2015).*

* cited by examiner

*Primary Examiner* — Scott A. Waldron
(74) *Attorney, Agent, or Firm* — Lee & Hayes, P.C.

(57) ABSTRACT

A flexible tagging and searching system can be configured to associate tags with the input data to enable a search of the input data. The flexible tagging and searching system can receive user data and determine an identifier associated with the user data. The system can compare the identifier with other identifiers to determine that the identifier is unique. After determining that the identifier is unique, the system can associate a critical tag with the user data and store the critical tag in a database. Then the system can associate a non-critical tag with the user data. In some instances, the system can return query results such as a set of tag data and/or a set of data items.

20 Claims, 11 Drawing Sheets

FLEXIBLE TAGGING AND SEARCHING SYSTEM

BACKGROUND

A user may use a variety of user computing services provided by a service-provider network. The user may submit user data that indicates a user request (e.g., support tickets) associated with the variety of user services. The user data may contain different types of data and/or implement different data formats. Additionally, different users may have different service level agreements with the service-provider network that require different processes for managing the different users. The different types of data and/or the different data formats can cause delays in determining a correct support team or support service that can address the user request resulting in a disappointing and/or frustrating user experience. Additionally, managing user requests can present technical challenges. For example, some user requests can contain incomplete data that can prevent a support team/service from addressing the user request while consuming storage space in a user request database. This can result in additional computational and human resources dedicated toward identifying and discarding incomplete user requests.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
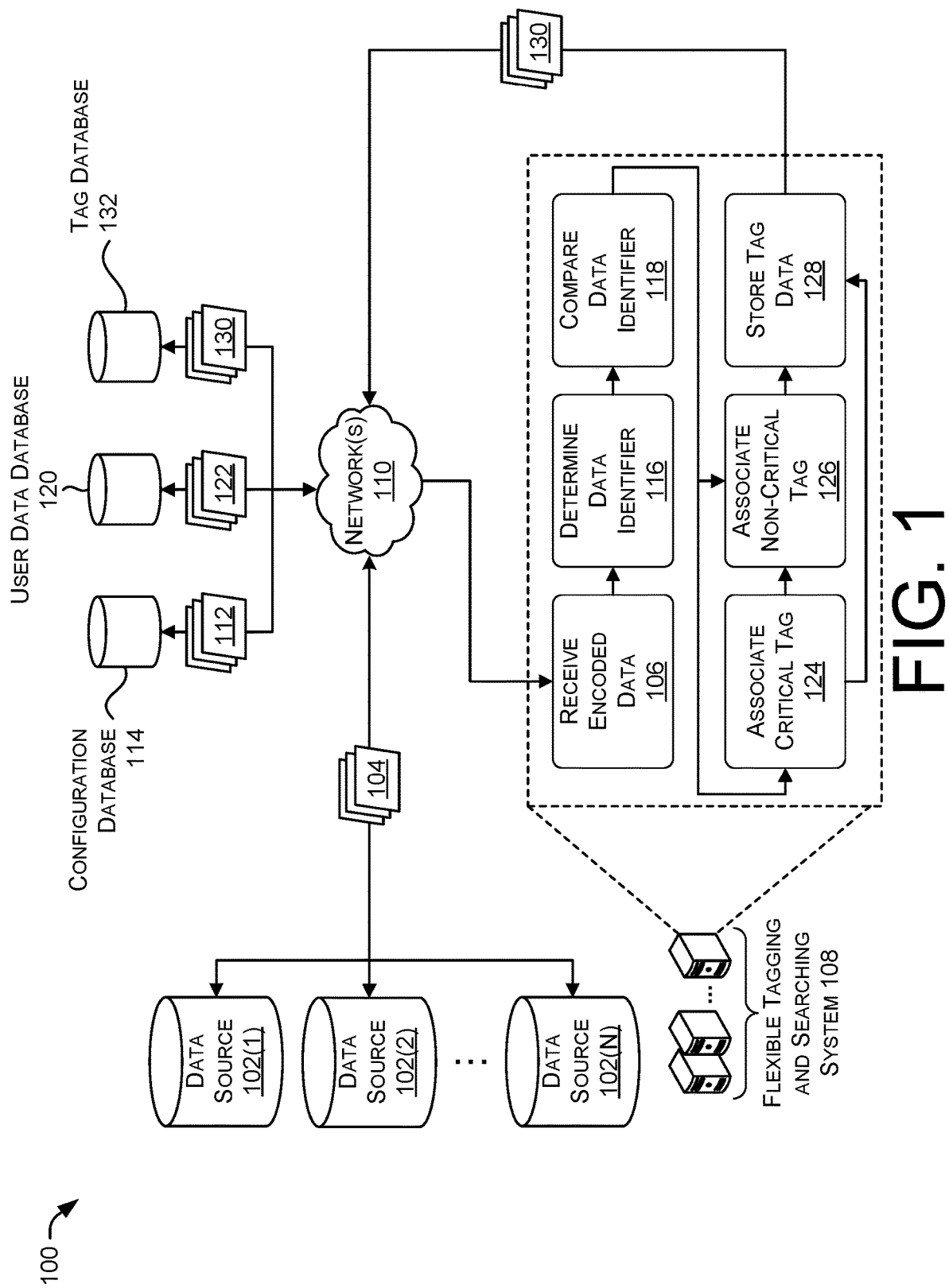
FIG. 1 is a pictorial diagram of a system for associating critical and/or non-critical tags with encoded data and storing the tag data.

The systems and processes described herein are directed to associating tags with input data and enabling search queries of the input data. A user can use a user service (e.g., web hosting) provided by a service-provider network. The user can request support regarding the user service through a support ticket. The support ticket can be transmitted to a data source where the support ticket is encoded into encoded data. Then a flexible tagging and searching system (also referred to as the tagging system) can be used to receive the encoded data and associate tags (e.g., critical and/or non-critical tags) with the encoded data and store the tags in a tag database. A consumer of the tagging system can then submit a request for tag data associated with a data item and/or submit a request for data items associated with a tag and the tagging system can provide the results of the request to the consumer.

As discussed above, a user can use a user service provided by a service-provider network. For example, the user can use a web hosting service provided by the service-provider network. In some instances, the user can use an online data storage service (e.g., cloud storage) and/or an on-demand computational computing service. In some instances, the user can use a subscription service that streams media items (e.g., music, television shows, electronic books, movies, photos, etc.), that provides physical items (e.g., books, clothing, food, etc.), and/or that provides other user services (e.g., transportation, cleaning, delivery, etc.). In some instances, a user can opt into a user data collection service and provide user data (e.g., user activity data, user location data, etc.) to the service-provider network.

The user can submit user data associated with the user service. For example, the user can submit user data that indicates a user request for assistance regarding the user service (e.g., a support ticket). For purposes of illustration only, the user data can indicate a user request regarding how to update user information associated with the user service. In some instances, the user data can indicate an error that the user is experiencing with the user service. In some instances, the user data can include a user identifier that associates the user data with a user. In addition, or alternatively, to the user data including a user request, the user data can indicate a user's activity associated with the user service. For purposes of illustration only, the user can use a music streaming service and elect to submit location data associated with a user's use of the music streaming service. In some instances, a user device associated with the user can optionally be configured to periodically submit the user data. For purposes of illustration only, a user device (e.g., a cell phone) can, on a regular and/or an irregular basis, submit user data using a data connection of the user device (e.g., WiFi, cellular data, etc.).

The user data can be transmitted to a data source. For example, the data source can be a database that stores user data. In some instances, the data source can be unique to the user service used by the user. For purposes of illustration only, the user can use a web hosting service and the data source can be associated with only the web hosting service. In some instances, the data source can be associated with multiple user services. For purposes of illustration only, the user can use a web hosting service and a different user can use a data storage service where the data source is associated with the web hosting service and the data storage service.

The data source can assign a data identifier (also referred to as a case identifier) with the user data that can identify, for example, a user case. For example, a user case can relate to an issue that the user is having with the user service and the user data can include a user request for assistance and the data source can associate a data identifier with the user data. The data identifier can uniquely identify the user request and allow a support team to identify the user request based on the data identifier. In some instances, the data source can encode the user data. For example, the data source can encode the user data and the data identifier into a JavaScript Object Notation (JSON) encoded data or a YAML Ain't Markup Language (YAML) encoded data, although other encodings are contemplated such as eXtensible Markup Language (XML), Tom's Obvious Minimal Language (TOML), CoffeeScript Object Notation (CSON), etc. In some instances, the data source can use a configuration file (also referred to as a set of user rules) to determine how to encode the user data. For example, the data source can access the configuration file from a configuration file database. The configuration file can be associated with the user (also referred to as user rules) and/or the user service (also referred to as user service rules) and the configuration file can indicate, for purposes of illustration only, that the user data can be encoded into JSON encoded data (e.g., JSON encoded input data).

In some instances, a tagging system can execute a syntax checker to determine a markup type (e.g., JSON, YAML, XML, TOML, CSON, etc.) and determine a syntax verification indicating that the encoded data is proper formatted or improperly formatted. If the encoded data is properly formatted the tagging system can continue to process the encoded data. If the encoded data is improperly formatted, the encoded data can be discarded and/or submitted to a fault queue to be handled by a support team and/or support service. The encoded data can be transmitted to the tagging system in real-time or near real-time. For example, as the user data is submitted to the data source, the data source can encode the user data into encoded data. Then, the data source can transmit the encoded data to the tagging system. In some instances, the user data can be submitted directly to the tagging system and the tagging system can be configured to generate the encoded data from the user data based on a configuration file. For example, the tagging system can access the configuration file from the configuration file database and encode, based on the configuration file, the user data into the encoded data.

In some instances, the encoded data can be transmitted to the tagging system based on a schedule. For example, a scheduling service can determine a schedule for transmitting the encoded data to the tagging system. In some instances, the scheduling service can be preconfigured. For purposes of illustration only, the scheduling service can be configured to schedule a transmission of the encoded data every 5 seconds. In some instances, the schedule can be based on a time of day and/or a computational resource (e.g., network availability, computational availability, etc.). For purposes of illustration only, the scheduling service can be configured to schedule a transmission of the encoded data every 5 seconds and increase the frequency to every 3 seconds between the hours of 9 p.m. and 5 a.m. Additionally, or alternatively, the scheduling service can be configured to schedule a transmission of the encoded data every 5 seconds and increase the frequency to every 3 seconds when the scheduling service detects an amount of computational resource consumption that does not meet or exceed a computational resource consumption threshold.

In some instances, the scheduling service can access the configuration database and determine the schedule based on the configuration file. As discussed above, the configuration file can be associated with the user and/or the user service. Therefore, the scheduling service can use the configuration file to determine the schedule for the user and/or for users of the user service.

The scheduling service, based on the schedule, can transmit instructions to the data source to transmit the encoded data to the tagging system and/or transmit instructions to the tagging system to retrieve the encoded data from the data source.

In some instances, the encoded data can be transmitted to the tagging system on-demand. For example, a consumer of the tagging system can submit a request that includes tag data associated with encoded data and/or encoded data associated with a tag. The request can cause the tagging system to retrieve encoded data from the data source.

After the tagging system receives and/or retrieves the encoded data, the tagging system can determine a data identifier associated with the encoded data. As discussed above, in some instances, the data source can assign a data identifier with the user data and encode the data identifier in the encoded data. In some instances, for example when the tagging system receives the user data directly, the tagging system can assign the data identifier with the user data.

The tagging system can access a user data database and compare the data identifier with other data identifiers stored in the user data database. The user data database can be an SQL or a NoSQL database service that supports key-value and/or document data structures (e.g., a key-value database). For example, the user and/or other users can submit a plurality of user data. The individual user data of the plurality of the user data can be assigned other data identifiers and the other data identifiers can be stored in the user data database. The tagging system can access the user data database and compare the data identifier with the other data identifiers to determine if this user data has been submitted previously.

The tagging system can determine that the data identifier is unique (i.e., the data identifier is not duplicated in the user data database). Then the tagging system can associate a critical tag(s) (e.g., a priority tag(s)) with the encoded data. For purposes of illustration only, the tagging system can access the configuration file associated with the user and/or the user service and determine, based on the configuration file, that a region is a type of critical data. In some instances, the configuration file can indicate that a support department is a type of critical data where the support department tag indicates a particular department that is authorized to address the user data. Additionally, the tagging system can determine that the encoded data includes a support ticket and that the encoded data includes a region associated with the support ticket. The region can indicate a geographic region of where the user is located. Based on the configuration file and determining that the encoded data includes a support ticket and a region associated with the support ticket, the tagging system can associate a critical tag with the encoded data. The critical tag can indicate that the encoded data contains the minimum amount of information required for a support team to address the user request.

In some instances, the tagging system can determine that the data identifier is not unique (i.e., the data identifier is duplicated in the data database). Then, the tagging system can associate a non-critical tag(s) (e.g., non-priority tag(s)) with the encoded data. For purposes of illustration only, the tagging system can access the configuration file associated with the user and/or the user service and determine, based on the configuration file, that a severity level is a type of non-critical data.

The configuration file can be defined by a support team and/or a support service and/or the user associated with the user service. The configuration file can identify a set of rules that can indicate types of data to be included in the encoded data to determine a critical tag and/or a non-critical tag. By way of example and without limitation, the configuration file can indicate that a "SUPPORT_DEPT" tag is a critical tag that indicates the support department that will handle the user case. Additionally, the configuration file can indicate that in order to associate the "SUPPORT_DEPT" tag with the encoded data, data fields (also referred to as keys) "LANGUAGE" and "REGION" are required (the required data fields also referred to as a critical data threshold). Therefore, if a "LANGUAGE" key and/or a "REGION" key is omitted from the encoded data, then, based on the configuration file, the tagging system could not apply the "SUPPORT_DEPT" tag because the encoded data does not meet the critical data threshold and the critical tagging process can fail.

In some instances, the configuration file can indicate that a service level agreement (SLA) is required to associate a non-critical tag where the SLA indicates that an SLA is in place between the user and the user service provider. Additionally, the tagging system can determine that the encoded data includes a support ticket and that the encoded data includes a severity level associated with the support ticket. The severity level can indicate a severity level of the support ticket as indicated by the user (e.g., a low severity, a medium severity, a high severity, etc.). Based on the configuration file and determining that the encoded data includes a support ticket and a severity associated with the support ticket, the tagging system can associate a non-critical tag with the encoded data. The non-critical tag can indicate that the encoded data has additional information that can assist a support team address the user request.

After the tagging system associates a critical tag(s) and/or non-critical tag(s) with the encoded data, the tagging system can store the critical tag data and/or the non-critical tag data in a tag database. In some instances, the tag database can be, similar to the user data database, an SQL or a NoSQL database service that supports key-value and/or document data structures. In some instances, the tag database can store the data identifiers and, in some instances, the user data database can store the tag data.

After storing the critical tag data in the tag database, the tagging system can determine whether to associate non-critical tag(s) with the encoded data. As discussed above, the tagging system can, using the configuration file, determine whether to associate the non-critical tag(s) with the encoded data. For example, the configuration file can indicate that there are no non-critical data types and the tagging system can complete the tagging process. In some instances, the configuration file can indicate that there are non-critical data types and proceed to associate non-critical tag(s) with the encoded data.

The tagging system can encounter errors in the tagging process. For example, the tagging system can determine that a data identifier is unique and also determine that the encoded data does meet the critical data threshold as indicated by the configuration file. For purposes of illustration only, the configuration file can indicate that a region is a type of data required to apply a critical tag and the tagging system can determine that the encoded data does not include region data. Based on determining that the encoded data is defective, the tagging system can discard the encoded data and indicate to the data source that the encoded data is defective. Discarding the encoded data can prevent a continued storage of the encoded data. In some instances, the encoded data can be transmitted to a fault queue that can store encoded data that is defective for later triage. For example, the fault queue can be a lower priority queue that a support team and/or a support service can monitor. In some instances, the tagging system can transmit a fault ticket and/or log data associated with the defective encoded data to the support team and/or the support service. The support team/service can then root cause the failure and take actions such as correcting the encoded data and reinitiating the tagging process, discarding the encoded data from the fault queue if the encoded data cannot be corrected, and/or contacting the user associated with the encoded data to correct the encoded data.

In some instances, a computing system executing the tagging process can experience a failure that interrupts the tagging process. For purposes of illustration only, the computing system executing the tagging process can experience a power failure or a network failure. Similarly, the tagging system can detect that the failure has occurred and transmit the encoded data and/or log to the fault queue for later triage. For example, a support team/service can inspect the encoded data and/or the log data from the fault queue and take actions, as discussed above, such as reinitiating the tagging process.

In some instances, the critical tagging process can occur synchronously and the non-critical tagging process can occur asynchronously. For example, the tagging system can initiate the critical tagging process as the encoded data is received at the tagging system (e.g., synchronously). Because a support team typically requires a completion of the critical tagging process to be complete before the support team can address the user request, initiating the critical tagging process synchronously can allow non-defective user requests to be tagged and addressed by the support team and prevent defective user requests from being considered by the support team. The tagging system can initiate the non-critical tagging process at a time after the critical tagging process completes (e.g., asynchronously). Because the support team typically does not require a completion of the non-critical tagging process to be complete before the support team can address the user request, the non-critical tagging process can occur at a later time. Additionally, a fault associated with the non-critical tagging process will not prevent the support team from addressing the user request as completion of the non-critical tagging process is not required.

The ability to provide access to multiple data sources and query for data presents technical challenges. One challenge, for example and as discussed above, involves managing data across different data sources. A first data source can be associated with a first user service that provides web hosting services and a second data source can be associated with a second user service that provides data storage services. The first data source and the second data source can be managed by different development teams and may not have any cross-data source relationships. For example, a user can use the first user service and the second user service and because of a lack of cross-data source relationships, it can be difficult identify all of the user requests associated with the user regardless of the user service. Additionally, accessing the data source and/or the data format of the encoded data can be different. For example, accessing the first data source can require unique commands and/or permissions that are different from the second data source and the data sources can output the encoded data differently making queries slow and difficult to manage.

To address these technological problems, the system described herein can, by tagging the encoded data with critical tags and/or non-critical tags, provide a consistent and simpler mechanism by which consumers (e.g., support teams) can query the tagging system to obtain user requests and/or data identifiers.

Additionally, the techniques discussed herein can improve a functioning of a computing device by decreasing the amount of computing resources consumed by storing defective or unnecessary user data. For example, and as discussed above, the configuration file can indicate the types of data that are critical. During the critical tagging process, the tagging system can determine that some of the encoded data (e.g., support tickets) is defective in that it does not contain the types of data that are critical and therefore cannot be addressed by a support team. Then the tagging system can discard the support tickets and/or place the support tickets in a fault queue. This can reduce the amount of computing resources (e.g., data storage) used to store otherwise defective support tickets. Additionally, when querying the tagging system, this can prevent defective support tickets from reaching a support team reducing the amount of computing resources (e.g., network bandwidth, processing resources, etc.) used to conduct a search and transmit the query results back to the support team. Therefore, the functioning of a computing device can be increased by reducing the resources consumed by storing and providing defective support tickets.

For purposes of illustration only, the process of tagging encoded data can include a user that uses a user service (e.g., an online data storage service) provided by a service-provider network, submitting user data that includes a support request regarding the user service. The user data can be stored in a data source that associates a unique data identifier with the user data. The data identifier can allow a support team/service to uniquely identify the support request. Additionally, the data source can generate, based on the user data, encoded data. The encoded data can provide a data-format structure that is consistent across other user services (e.g., web hosting) that can allow for faster and simpler parsing of the encoded data due to the consistent format rather than each user service providing different data formats.

The encoded data can be transmitted to a tagging system that can associate the encoded data with critical tags and/or non-critical tags. An encoded data that is associated with critical tags indicates that the encoded data contains at least the minimum amount of information required for a support team/service to address the support request (e.g., the critical data threshold). If the encoded data is not associated with critical tags, then the encoded data is defective and the encoded data can be discarded or corrected, as discussed above. An encoded data that is associated with non-critical tags indicates that the encoded data contains additional information that can assist the support team/service address the support request but is not required for the support team/service to address the support request.

When the tagging system receives the encoded data, it can first compare the data identifier with other data identifiers in a user data database. When a support request is successfully processed and the encoded data is associated with the critical tags, the tagging system can store the data identifier associated with the support request in a user data database. This indicates that the encoded data contains at least the minimum amount of information required for the support team/service to address the support request (e.g., the critical data threshold). Therefore, if the tagging system receives a data identifier that matches with a data identifier already in the user data database, this can indicate that the tagging process has already successfully processed this support request and additional critical tags are no longer needed. This can indicate that non-critical data associated with the support request may have been updated. Then the tagging system can initiate the non-critical tagging process instead of initiating the critical tagging process. If the tagging system receives a data identifier that does not match with any data identifier already in the user data database, this can indicate that this is the first instance of receiving this support request.

To initiate the critical or the non-critical tagging process, the tagging system can access a configuration file that is associated with the user and/or the user service. The configuration file can indicate the types of data that are required to apply critical tags and non-critical tags. For example, the configuration file can indicate that a language is required to apply a critical tag and that a severity is required to apply a non-critical tag. Thus, if an encoded data does not indicate the language, then the encoded data is defective. However, if an encoded data does indicate the language and does not indicate a severity, the encoded data can still be associated with a critical tag and a support team/service can address the support request.

After the accessing the configuration file, the tagging system can determine the types of data that are critical and non-critical and determine whether the encoded data includes the critical types of data and/or the non-critical types of data. Because the encoded data requires the critical tags in order to be addressed by a support team/service, if the critical tagging process and the non-critical tagging process needs to be executed, the tagging system can initiate the critical tagging process first. The non-critical tagging process can be executed at a later time.

After the critical tagging process completes, the tagging system can store the critical tag and/or the encoded data in a tag database. Similarly, after the non-critical tagging process completes, the tagging system can store the non-critical tag and/or the encoded data in the tag database.

FIG. 1 is a pictorial flow diagram of an example process for associating critical and/or non-critical tags with encoded data and storing the tag data. Some portions of example process 100 can be omitted, replaced, and/or reordered while still providing the functionality of associating the critical and/or non-critical tags with the encoded data and storing the tag data. Each operation can represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

A user can use a user service provided by a service-provider network. For purposes of illustration only, the user service can include a web hosting service, a data storage service, a streaming media service, a delivery service etc. the user can submit user data to the data sources 102(1), 102(2)-102(N) and the data sources 102(1), 102(2)-102(N)

can be associated with the user service (e.g., web hosting services, data storage services, etc.)

For example, a user can submit user data that indicates a user request for assistance regarding a user service (e.g., a support ticket). In some instances, a user can submit user data that includes activity data of the user associated with the user service. For purposes of illustration only, the activity data can include an amount of media item consumption.

The data sources 102(1), 102(2)-102(N) can be configured to store encoded data 104 where the encoded data 104 can include user data that that is encoded as JSON encoded data, although other types of encodings are contemplated. For purposes of illustration only, the encoded data 104 can include key-value pairs such as:

"FIRST_NAME": "JOHN",
"LAST_NAME": "SMITH",
"LANGUAGE": "ENGLISH"

At operation 106, the data sources 102(1), 102(2)-102(N) can transmit the encoded data 104 to a flexible tagging and searching system 108 (also referred to as a tagging system) via one or more networks 110. In some instances, the tagging system 108 can retrieve the encoded data 104 from the data sources 102(1), 102(2)-102(N). For example, the data sources 102(1), 102(2)-102(N) and/or the tagging system 108 can be configured to transmit and/or retrieve the encoded data 104 based on a schedule. In some instances, the schedule can be defined in a configuration file 112 that is stored in a configuration database 114 that can be an SQL or a NoSQL database service that supports key-value and/or document data structures. The configuration file 112 can be associated with a user (also referred to as user rules) and/or a user service (also referred to as user service rules). The configuration file 112 can indicate a schedule for the data sources 102(1), 102(2)-102(N) and/or the tagging system 108 can be configured to transmit and/or retrieve the encoded data 104. In some instances, a scheduling service can use the configuration file 112 and instruct the data sources 102(1), 102(2)-102(N) and/or the tagging system 108 to transmit and/or retrieve the encoded data 104.

At operation 116, the tagging system 108 can determine a data identifier associated with the encoded data 104. In some instances, a user can submit the user data that includes a support request (e.g., a support ticket) that is stored at the data sources 102(1), 102(2)-102(N) as encoded data 104. Then the data sources 102(1), 102(2)-102(N) can associate a data identifier with the encoded data 104. For purposes of illustration only, the encoded data 104 can include the data identifier as a key-value pair such as:

"DATA_ID": "5"

that can indicate that the data identifier is the numeric value 5. The data identifier can uniquely identify the encoded data 104 and the tagging system 108 can determine the data identifier from the encoded data 104.

In some instances, the encoded data 104 can include activity data associate with the user's activity when using the user service. As discussed above, the activity data can include an amount of, a duration of, a frequency of, a type of, etc. media item consumption. In such instances, the data sources 102(1), 102(2)-102(N) can associate an activity identifier with the encoded data 104.

At operation 118, the tagging system 108 can compare the data identifier (e.g., one or more characters, numbers, and/or symbols) with other data identifiers to determine if the data identifier is unique. For example, the tagging system 108 can access a user data database 120 that can be an SQL or a NoSQL database service that supports key-value and/or document data structures. From the user data database 120, the tagging system 108 can obtain a plurality of data identifiers 122 from the user data database 120 and compare the data identifier with the plurality of data identifiers 122. The plurality of data identifiers 122 can be associated with other user data from the user and/or other users.

If the tagging system 108 determines that the data identifier is unique (e.g., the data identifier is different from other existing data identifiers), the tagging system can proceed to operation 124. In this scenario, the tagging system 108 may determine that the encoded data associated with the data identifier (or similar data) has not been processed/analyzed and/or has not previously been associated with one or more tags. If the tagging system 108 determines that the data identifier is not unique (e.g., the data identifier is the same as an existing data identifier), the tagging system can proceed to operation 126. Here, the tagging system 108 may determine that the encoded data associated with the data identifier (or similar data) has previously been processed and/or has been associated with one or more tags.

At operation 124, the tagging system 108 can initiate a critical tagging process and associate a critical tag(s) with the encoded data 104. For example, the tagging system 108 can use the configuration file 112 to determine the types of data that are required to apply a critical tag for the user and/or the user service. For purposes of illustration only, the configuration file 112 can indicate that a language is type of data required to determine the critical tag, determine that a language is specified in the encoded data 104, and associate a critical tag with the encoded data. As discussed above, the critical tag can indicate that the encoded data 104 contains at least the minimum amount of information required for a support team/service to address the support request (e.g., the critical data threshold).

After completing the critical tagging process, the tagging system 108 can proceed to operation 128 and store the tag data 130 that includes the critical tag in a tag database 132, that can be an SQL or a NoSQL database service that supports key-value and/or document data structures. The tagging system 108 can simultaneously and/or subsequently to storing the tag data 130, proceed to operation 126 to initiate a non-critical tagging process and associate a non-critical tag(s) with the encoded data 104. For purposes of illustration only, the configuration file 112 can indicate that a severity is a non-critical type of data and determine that the severity is specified in the encoded data 104. The severity can indicate a severity of the support request as indicated by the user (e.g., a low severity, a medium severity, a high severity).

As discussed above, the tagging system 108 can proceed to operation 126 after determining that the data identifier is not unique at operation 118. If the data identifier is not unique, the tagging system 108 can determine that the encoded data 104 has been processed at a previous time and that the critical tagging process associated with the encoded data 104 has completed. Therefore, after operation 118, the tagging system 108 can bypass operation 124 and proceed to operation 126 to initiate the non-critical tagging process where the tagging system 108 can retry a failed attempt at associating a non-critical tag with the encoded data 104 and/or update the encoded data 104 with a non-critical tag that was not associated with the encoded data 104 at the previous time.

Figure 2:
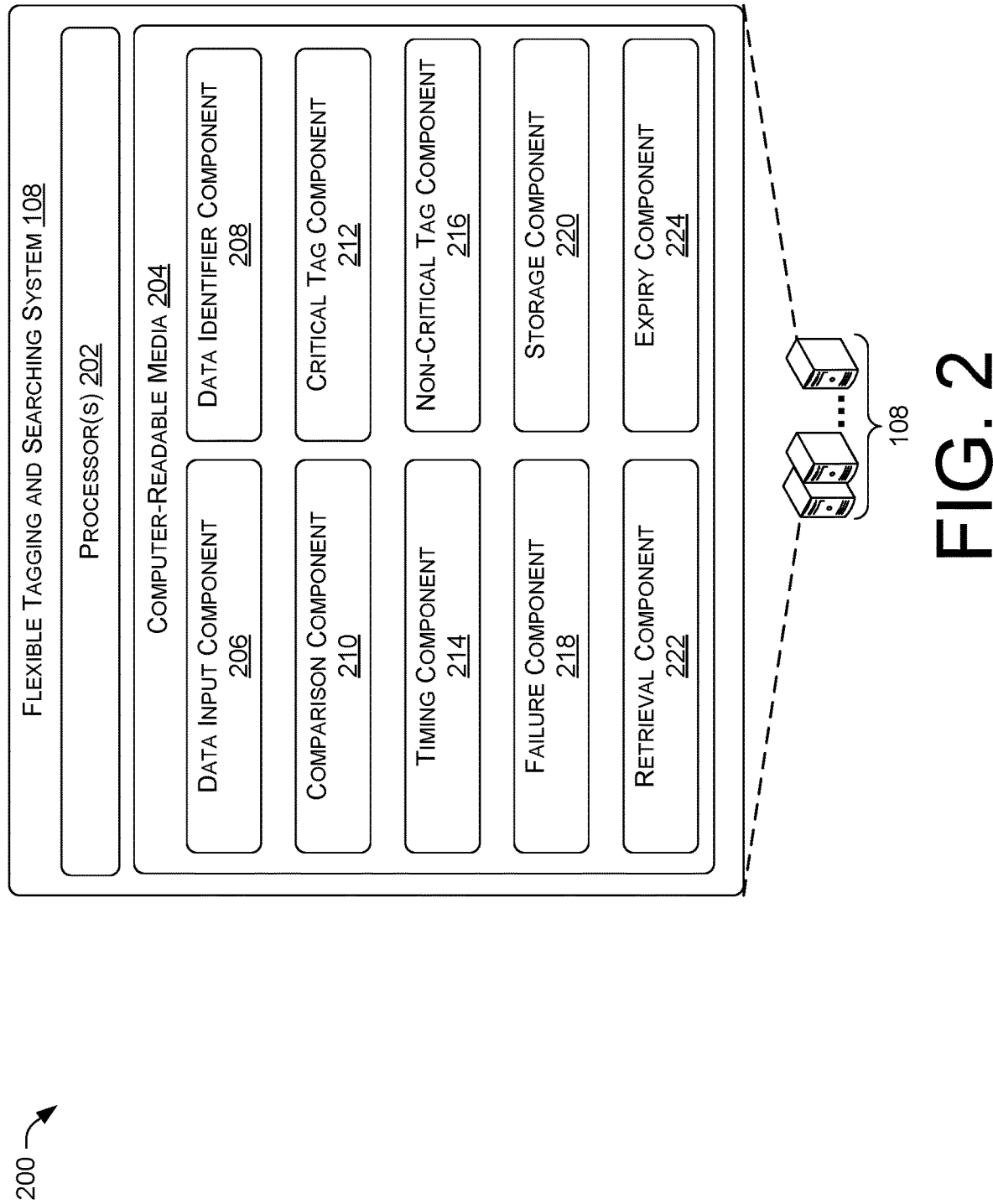
FIG. 2 is a system diagram of an illustrative computing architecture of a flexible tagging and searching system.

FIG. 2 is an illustrative computer architecture diagram 200 of a flexible tagging and searching system 108 (also referred to a tagging system).

The tagging system 108 can be implemented in a distributed or non-distributed computing environment. For example, some of the components can be distributed across multiple computing platforms or all of the components can be consolidated onto a single computing platform. Additionally, some of the components can be duplicated and implemented in parallel.

The tagging system 108 can include processor(s) 202 and a computer-readable media 204 that stores various modules, applications, programs, or other data. In some instances, the processor(s) 202 can include a central processing unit (CPU), a graphics processing unit (GPU), both a CPU and a GPU, or other processing units or components known in the art. Additionally, each of the processor(s) 202 can possess its own local memory, which also may store program modules, program data, and/or one or more operating systems. The computer-readable media 204 can also include instructions, that when executed by the processor(s) 202, cause the processor(s) 202 to perform the operations described herein for the tagging system 108.

The computer-readable media 204 can be provided as a computer program product including a non-transitory machine-readable storage medium having stored thereon instructions (in compressed or uncompressed form) that can be used to program a computer (or other electronic device) to perform processes or methods described herein. The machine-readable storage medium can include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. The computer-readable media 204 can also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

The computer-readable media 204 can store a data input component 206, a data identifier component 208, a comparison component 210, a critical tag component 212, a timing component 214, a non-critical tag component 216, a failure component 218, a storage component 220, a retrieval component 222, and an expiry component 224. Though depicted as residing in the computer-readable media 204 for illustrative purposes, it is contemplated that the data input component 206, the data identifier component 208, the comparison component 210, the critical tag component 212, the timing component 214, the non-critical tag component 216, the failure component 218, the storage component 220, the retrieval component 222, and the expiry component 224 can additionally, or alternatively, be accessible to the tagging system 108 (e.g., stored remotely).

The data input component 206 can receive encoded data from a data source. For example, a data source can store user data as encoded data. The user data can include a support request related to a user service associated with a user and/or include activity data related to the user service. As the data source receives the user data, it can generate the encoded data and transmit the encoded data to the data input component 206. By encoding the user data, the encoded data can provide a consistent structure to the user data that may not exist prior to encoding.

In some instances, the data source can transmit the encoded data to the data input component 206 based on a schedule indicated by a configuration file. In some instances, the data source can transmit the encoded data to the data input component 206 based on a computing resource availability. For purposes of illustration only, the data source can transmit the encoded data when a network congestion is at or below a network congestion threshold.

In some instances, the data input component 206 can retrieve the encoded data from the data source. For example, the data input component 206 can be configured and/or instruction to retrieve the encoded data based on the schedule. In some instances, the data input component 206 can receive the user data in real-time or near real-time and generate the encoded data.

The data identifier component 208 can determine the data identifier associated with the encoded data. For example, the data source can determine a data identifier when generating the encoded data. The data source can include the data identifier in the encoded data. Similarly, the data input component 206 can, when generating the encoded data, determine a data identifier and include the data identifier in the encoded data. When the encoded data includes a support ticket, the data identifier can uniquely identify the support ticket and allow a support team/service identify the support ticket based on the data identifier. The data identifier component 208 can extract the case identifier from the encoded data.

The comparison component 210 can compare the data identifier to other data identifiers where a duplicated data identifier can indicate that the encoded data has already been processed. For example, when executing and completing the critical tagging process, as discussed below, the tagging system can store the data identifier in the user data database. Therefore, each data identifier in the data database is associated with encoded data that has been processed and that has completed the critical tagging process. Additionally, the critical tag can indicate that the encoded data contains the minimum amount of information required for a support team/service to address the user request and does not need to be processed again.

To determine if the data identifier has been duplicated, the comparison component 210 can, for example, access a data database that includes a plurality of other data identifiers. The other data identifiers can be associated with other support tickets of the user and/or other users as each data identifier is unique to an individual support ticket. The comparison component 210 can determine whether the data identifier is a unique data identifier or is duplicated in the user data database. A duplicated data identifier can indicate that the encoded data has been updated that that the non-critical tagging process might need to be executed. A unique data identifier can indicate that this is the first instance of processing the encoded data.

The critical tag component 212 can initiate a critical tagging process. For example, the comparison component 210 can determine that the data identifier is unique and based on determining that the data identifier is unique, the critical tag component 212 can initiate the critical tagging process. The critical tagging process can include accessing a configuration file from a configuration database. The configuration file can be associated with the user and/or the user service. For example, the critical tag component 212 can extract a user identifier (e.g., a user identifier number, a user name, etc.) from the encoded data and determine if a configuration file in the configuration database is associated with the user. In some instances, the critical tag component 212 can extract a user service from the encoded data and determine if a configuration file in the configuration database is associated with the user service.

The configuration file can indicate types of data that are required to associate a critical tag with the encoded data. By way of example and without limitation, the configuration file can indicate that a "SUPPORT_DEPT" tag is a critical tag that indicates the support department that will handle the user case. Additionally, the configuration file can indicate that in order to associate the "SUPPORT_DEPT" tag with the encoded data, data fields (also referred to as keys) "LANGUAGE" and "REGION" are required. The critical tag component 212 can inspect the encoded data and determine whether the encoded data indicates a language and a region. If the encoded data indicates a language and a region, the critical tag component 212 can associate a critical tag with the encoded data. If the encoded data does not indicate a language or a region, the critical tag component 212 can discard the encoded data as it is defective and does not meet the requirements or the data threshold specified by the configuration file. In some instances, the critical tag component 212 can transmit the defective encoded data to a fault queue that can store the defective encoded data for later triage.

The timing component 214 can monitor an amount of time to associate a critical tag with the encoded data. For example, the timing component 214 can determine an input time associated with when the data input component 206 received the encoded data and determine a critical tag time associated with when the critical tag component 212 associates a critical tag with the encoded data. In some instances, the timing component 214 can be configured to determine the duration of time between the input time and the critical tag time and compare the duration of time with a critical tag time threshold (also referred to as a priority tag time threshold). If the duration of time meets or exceeds the critical tag time threshold, the timing component 214 can generate an indication of a fault and log the fault.

The non-critical tag component 216 can initiate a non-critical tagging process. For example, the comparison component 210 can determine that the data identifier is not unique and/or the critical tag component 212 can complete the critical tagging process and then the non-critical tag component 216 can initiate the non-critical tagging process. The non-critical tagging process can include accessing the configuration file that can, by way of example and without limitation, indicate that a "HIGH_PRIORITY" tag is a non-critical tag that indicates a priority of the user request. Additionally, the configuration file can indicate that in order to associate the "HIGH_PRIORITY" tag with the encoded data, data field "SEVERITY" is required and/or that to associate the "SUPPORT_EXP" tag (e.g., support experience tag) with the encoded data, that the data field "COMPLEXITY" is required. The non-critical tag component 216 can inspect the encoded data and determine whether the encoded data indicates a severity. If the encoded data indicates a severity, the non-critical tag component 216 can associate the "HIGH_PRIORITY" non-critical tag with the encoded data. If the encoded data does not indicate a severity, the non-critical tag component 216 can finish the non-critical tagging process or determine a different non-critical data type indicated by the configuration file.

The failure component 218 can determine if a failure has occurred during the critical tagging process (also referred to as the priority tagging process) and/or the non-critical tagging process (also referred to as the non-priority tagging process). For purposes of illustration only, a computing system that is executing the critical tagging process can experience a power outage, limited network bandwidth, latency, etc. The failure component 218 can monitor the critical tagging process and determine that it did not complete and instruct the critical tag component 212 to reinitiate the critical tagging process. Similarly, the failure component 218 can monitor the non-critical tagging process and determine that it did not complete and instruct the non-critical tag component 216 to reinitiate the non-critical tagging process. In some instances, the failure component 218 can transmit the encoded data that could not complete the critical tagging process and/or the non-critical tagging process into a fault queue that can store the encoded data for later triage.

The storage component 220 can monitor the critical tagging process and/or the non-critical tagging process and determine a completion of the critical tagging process and/or the non-critical tagging process. After determining the completion of the critical tagging process and/or the non-critical tagging process, the storage component 220 can transmit the tag data (e.g., the critical tag and/or the non-critical tag) to a tag database that can store the tag data. In some instances, the storage component 220 can transmit the encoded data with the tag data to the tag database.

The retrieval component 222 can receive requests from a consumer of the tagging system 108. For example, the request can include a request tag and the retrieval component 222 can access the tag database to determine whether the request tag matches any of the tag data stored in the tag database. If the retrieval component 222 determines a match between the request tag and the tag data in the tag database, the retrieval component 222 can retrieve the encoded data associated with the request tag from the data source and/or the tag database. In some instances, the request can include a request data item. For purposes of illustration only, the request can include a user identifier. The retrieval component 222 can access the tag database and/or the data source to determine whether the user identifier matches a user identifier stored in the tag database and/or the data source. If the retrieval component 222 determines a match between the request data item and the encoded data stored in the tag database and/or the data source, the retrieval component 222 can retrieve the tag data associated with the request data item.

The expiry component 224 can monitor an amount of time that encoded data and/or tag data is stored in the data source and/or the tag database. For example, the expiry component 224 can determine an input time associated with when the storage component 220 transmits the tag data and/or the encoded data to the tag database and determine a duration of time between the storage time and a current time. If the duration of time meets or exceeds an expiration time threshold, the expiry component 224 can discard the tag data and/or the encoded data. In some instances, the expiration time threshold can be defined in the configuration file.

Discarding tag data and/or the encoded data can reduce an amount of computational resources (i.e., data storage) used by the tagging system 108 as well as increase user privacy by not storing data associated with a user for an indefinite amount of time.

Figure 3:
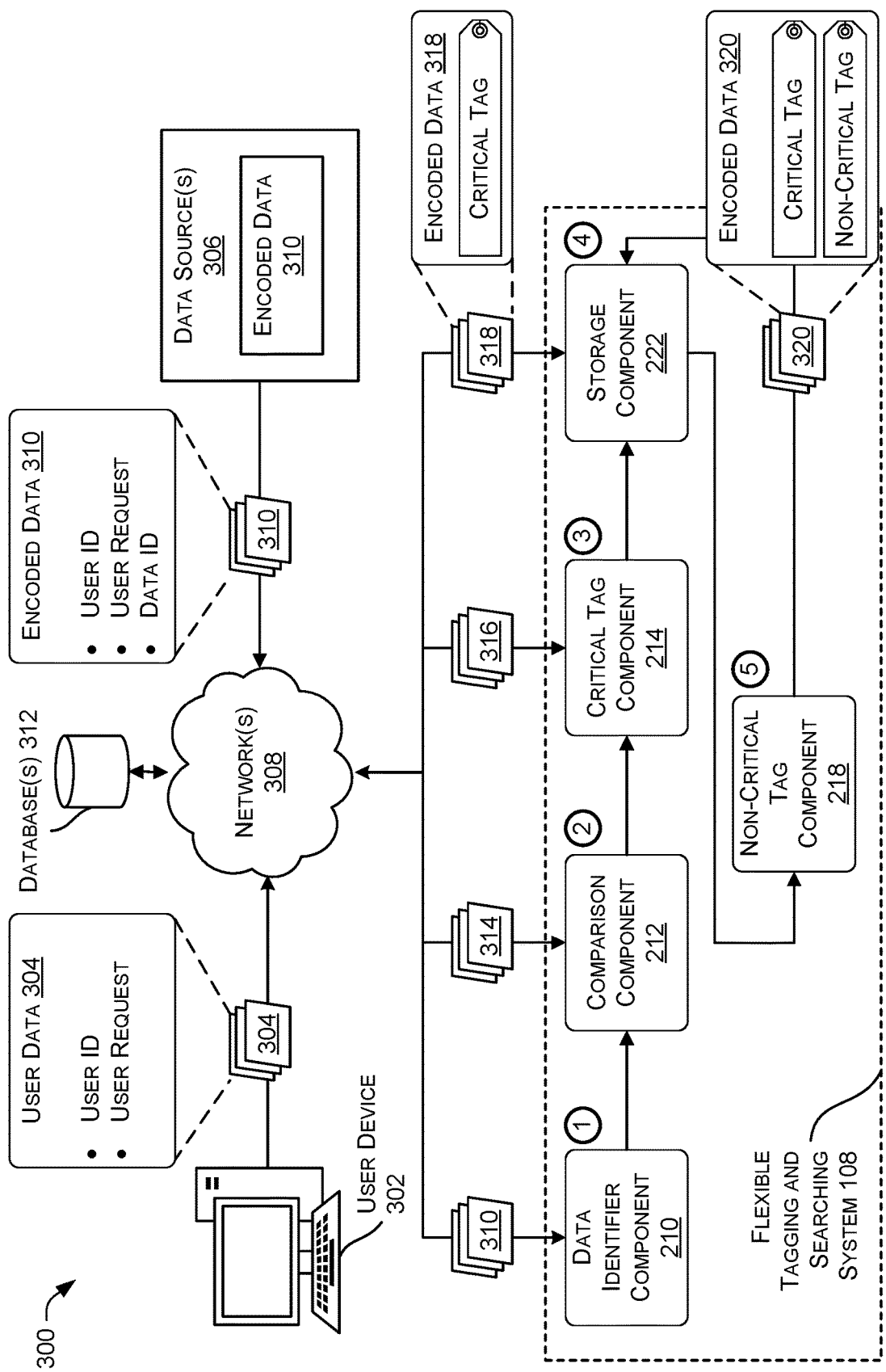
FIG. 3 is a pictorial diagram of an example process of a user device transmitting user data and receiving encoded data at a flexible tagging and searching system.

FIG. 3 is a pictorial flow diagram of an example process of a user device transmitting user data and receiving encoded data at a flexible tagging and searching system. The example process 300 is described with reference to the computer architecture 200 of FIG. 2. Some portions of example process 300 can be omitted, replaced, and/or reordered while still providing the functionality of transmitting the user data and receiving the encoded data at the flexible tagging and searching system. Each operation can represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. For example, some figures include numbering such as ①, ②, ③, etc. This numbering is intended to orient a reader to one possible order of operations, but is not intended to be construed as a limitation, as discussed herein.

A user device 302 can be a computing device (e.g., a laptop computer, a tablet computer, a cellphone, a smart speaker, a wearable device, etc.) associated with a user. The user can use a user service (e.g., a web hosting service, a data storage service, etc.) and submit user data 304. For example, user data 304 can include a user ID and a user request related to the user service. In some instances, the user request can be a support request. The user data can be transmitted to data source(s) 306 via network(s) 308. The data source(s) 306 can be similar to the data sources 102(1), 102(2)-102(N) and the network(s) 308 can be similar to the one or more networks 110 depicted in FIG. 1.

As discussed above, the data source(s) 306 can encode the user data 304 to generate encoded data 310. Additionally, the data source(s) 306 can determine a data ID and include the data ID in the encoded data 310. At ①, the data source(s) 306 can transmit, or the flexible tagging and searching system 108 can retrieve, the encoded data 310 and the data identifier component 208 can determine the data identifier associated with the encoded data 310. At ②, the comparison component 210 can access the database(s) 312 to access a plurality of data identifiers 314 and compare the data identifier with the plurality of data identifiers 314 to determine if the data identifier is unique. The database(s) 312 can be similar to the configuration database 114, the user data database 120, and/or the tag database 132 depicted in FIG. 1.

As discussed above, the data identifier is unique, the process can continue to ③ where the critical tag component 212 can access database(s) 312 and determine a configuration file 316 that identifies data required to associate a critical tag with the encoded data 310. Then the critical tag component 212 can initiate the critical tagging process and, when complete, proceed to ④ where the storage component 220 transmits the encoded data 318 that includes the critical tag to the database(s) 312.

While the critical tag component 212 initiates the critical tagging process, the non-critical tag component 216 can also initiate the non-critical tagging process at ⑤. Therefore, in some instances, the critical tagging process and the non-critical tagging process can occur concurrently. However, for purposes of illustration only, example process 300 depicts the critical tagging process completing before initiating the non-critical tagging process. Therefore, after ④, the example process 300 proceeds to ⑤ where, similarly, the non-critical tag component 216 can use the configuration file 316 to determine non-critical data types. Then the non-critical tag component 216 can initiate the non-critical tagging process and, when complete, proceed back to ④ where the storage component 220 transmits the encoded data 320 that includes the critical tag and the non-critical tag to the database(s) 312.

In this example, the encoded data 320 includes the same data as encoded data 318 while also including the non-critical tag. In this example, the database(s) 312 can update the encoded data 320 to include the non-critical tag rather than storing and/or duplicating similar data.

Figure 4:
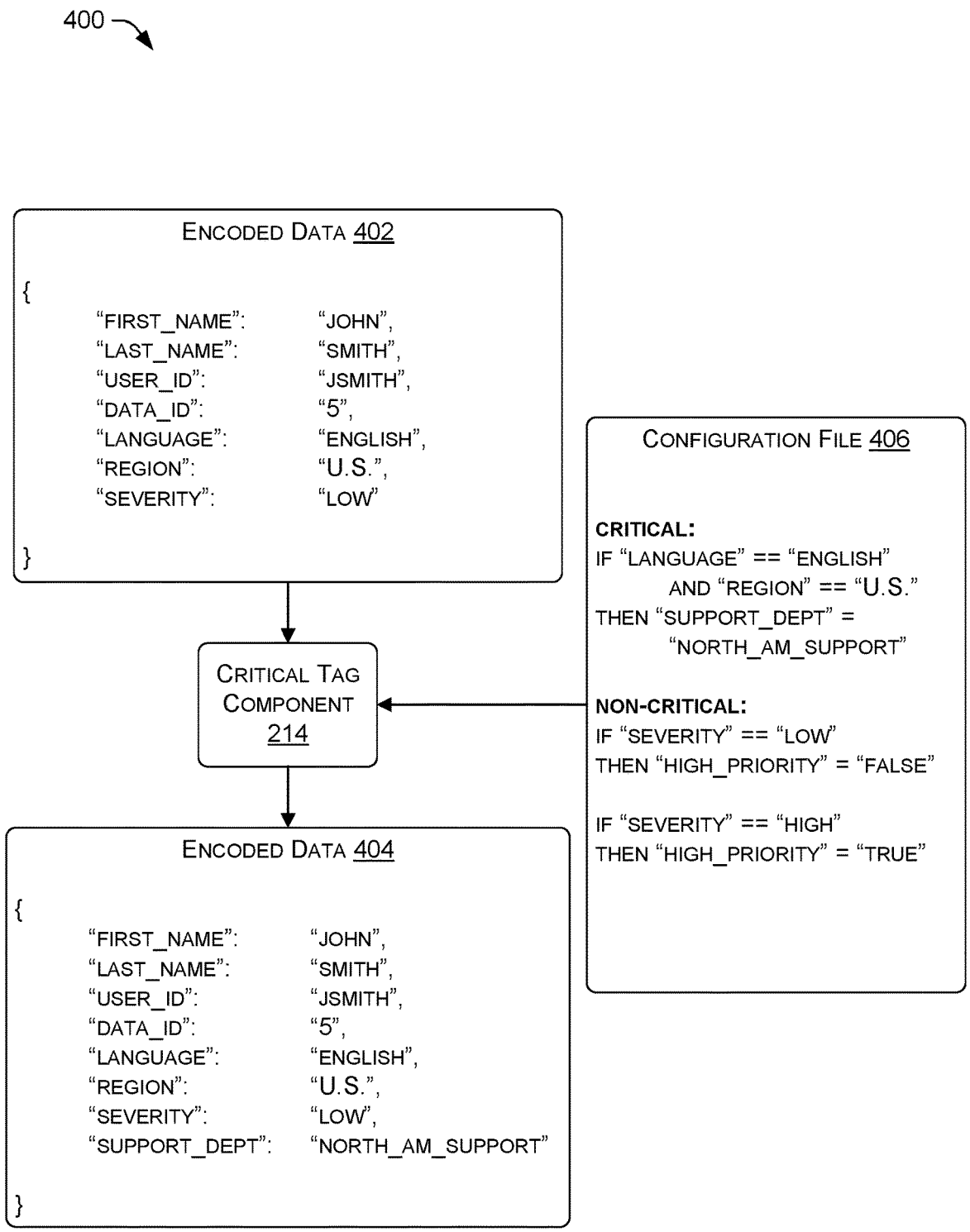
FIG. 4 is a pictorial diagram of an example encoded data before being associated with critical tag data and after being associated with critical tag data.

FIG. 4 is a pictorial diagram 400 of an example encoded data before being associated with critical tag data and after being associated with critical tag data. The pictorial diagram 400 is described with reference to the computer architecture 200 of FIG. 2. The encoded data 402 can be similar to the encoded data 104 and 310 depicted in FIG. 1 and FIG. 3, respectively.

As depicted, the encoded data 402 can be formatted as JSON encoded data. The first key of the key-value pairs is "FIRST_NAME" and the first value associated with the first key is "JOHN." The second key of the key-value pairs is "LAST_NAME" and the second value associated with the second key is "SMITH." The fourth key of the key-value pairs is "DATA_ID" that can be the data identifier and the fourth value associated with the fourth key is "5." The data identifier component 208 can extract the data identifier using the "DATA_ID" key by, for purposes of illustration only, executing code such as "encoded_data.name" and/or using a parse function. The comparison component 210 can compare the data identifier (e.g., "5") with the other data identifiers stored in the data database to determine that the data identifier is unique.

After determining that the data identifier is unique, the encoded data 402 can be transmitted to the critical tag component 212 that can associate critical tag data with the encoded data 402 to generate encoded data 404. The critical tag component 212 can access the configuration file 406 associated with the user identifier by using the key "USER_ID" to extract the "JSMITH" user identifier. The configuration file 406 can indicate, for example, the data used to generate the critical tags and the non-critical tags. By way of example and without limitation, the critical tag component 212 can, based on the language data type and the region data type, generate a critical type "SUPPORT_DEPT" tag. Additionally, the critical tag component 212 can generate the non-critical type "HIGH_PRIORITY" tag based on the severity data type. If, during the critical tagging process, either of the "LANGUAGE" key or the "REGION" did not return a value from the encoded data 402, then the critical tag component 212 can determine that the encoded data 402 is defective as it does not have values associated with each of the data types required to generate the critical tag.

Figure 5:
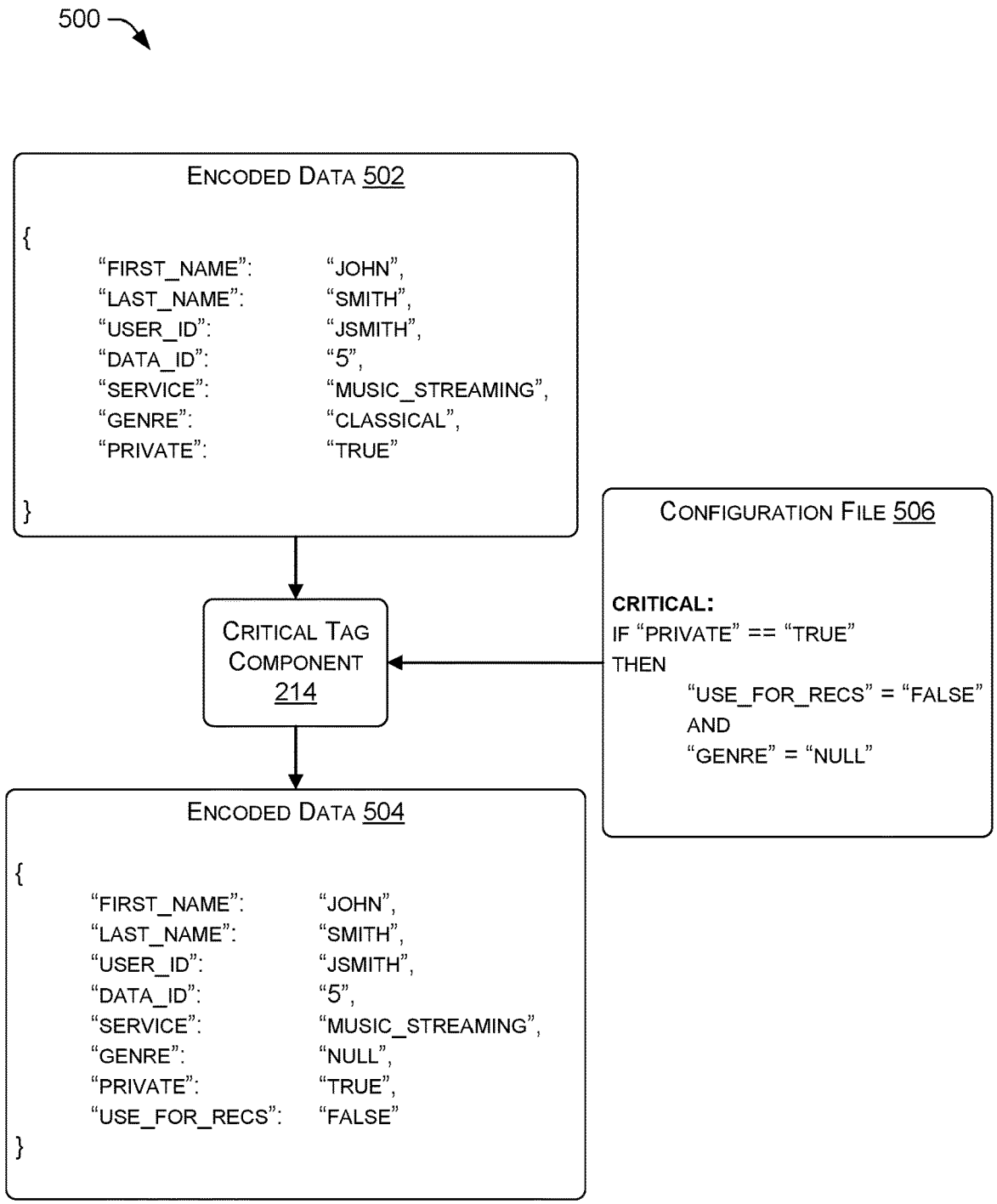
FIG. 5 is a pictorial diagram of an example encoded data that is associated with activity data before being associated with tag data and after being associated with tag data.

FIG. 5 is a pictorial diagram 500 of an example encoded data, that is associated with activity data, before associated with at tag data and after being associated with tag data. The pictorial diagram 500 is described with reference to the computer architecture 200 of FIG. 2.

As discussed above, user data submitted by a user can include activity data that is associated with a user service. For example, the user can subscribe to a music streaming service provided by a service-provider network.

As depicted, the encoded data 502 can be formatted as JSON encoded data. The first key of the key-value pairs is "FIRST_NAME" and the first value associated with the first key is "JOHN." The second key of the key-value pairs is "LAST_NAME" and the second value associated with the second key is "SMITH." The fifth key of the key-value pairs is "SERVICE" that can indicate the user service used by the user where the value associated with the "SERVICE" key is "MUSIC_STREAMING" indicating that the user uses a music streaming service. By way of example and without limitation, the "PRIVATE" key can indicate whether the user enabled a private streaming session where the private streaming sessions indicates that a portion of the activity data should be deleted and that the encoded data 502 should not be used to generate recommendations.

The encoded data 502 can be transmitted to the critical tag component 212. When the encoded data includes activity data rather than a support request, the critical tag component 212 can access a configuration file 506 associated with the user identifier by using the key "USER_ID" to extract the "JSMITH" user identifier or access the configuration file 506 associated with the user service by using the key "SERVICE" to extract the value "MUSIC_STREAMING."

By way of example and without limitation, the critical tag component 212 can, using the configuration file 506, to generate a critical type "USE_FOR RECS" tag and a "GENRE" tag. The "USE_FOR_RECS" tag can indicate whether the encoded data 504 can be used to generate recommendations for the user associated with the encoded data 502 and the encoded data 504. In some instances, if the configuration file 506 indicates a tag to be generated that is associated with a key already exists within the encoded data 502, then the critical tag component 212 can use the configuration file 506 to overwrite the value for the key. For example, as depicted in FIG. 5, encoded data 502 includes a "GENRE" key that is associated with the "CLASSICAL" value. The configuration file 506 can indicate that if the "PRIVATE" key is associated with the "TRUE" value, then the "GENRE" key should be associated with a "NULL" value. Therefore, after the critical tag component 212 completes the critical tagging process, the "GENRE" key in encoded data 504 can be associated with the "NULL" value replacing the "CLASSICAL" value. If the "PRIVATE" key does not return a value from the encoded data 502, then the critical tag component 212 can determine that the encoded data 502 is defective as it does not have value associated with the required data types to apply a critical tag.

For purposes of illustration only, the consumer of the tagging system can use the tag data to determine, for users of the music streaming service, the types of genres that the users consume and generate recommendations based on the activity data as indicated by the tag data. For example, the consumer can submit a genre request tag that indicates the classical genre to the tagging service and the retrieval component 222 can determine a match between the request tag and the tag data in the tag database. Then the retrieval component 222 can retrieve the encoded data associated with the request tag from the data source and/or the tag database and return a set of encoded data associated with the classical genre tag. The consumer can submit a series of genre request tags to determine a distribution of preferences of users to generate media item recommendations for the users.

Figure 6:
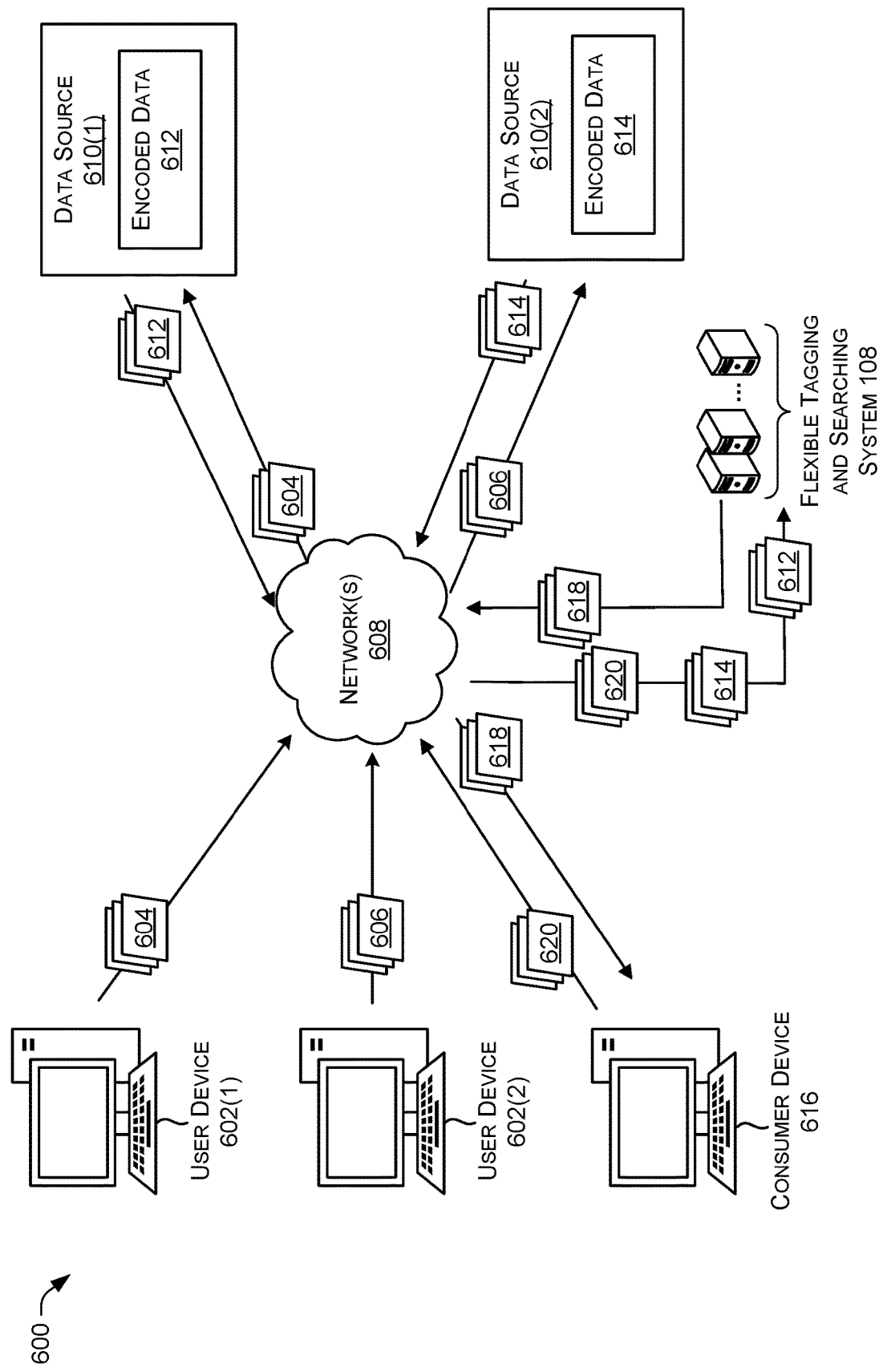
FIG. 6 is a pictorial diagram of example user devices transmitting user data to example data sources and a flexible tagging and searching system receiving the encoded data.

FIG. 6 is an illustrative operating environment 600 that includes multiple user devices and multiple data sources.

A user device 602(1) and a user device 602(2) can be associated with different user services. For example, a first user of user device 602(1) can be associated with a web hosting user service and a second user of user device 602(2) can be associated with a data storage user service. The user data 604 transmitted by user device 602(1) can include different user data and different user data formats when compared to the user data 606 transmitted by user device 602(2).

The user data 604 and 606 can be transmitted via network(s) 608 to data sources 610(1) and 610(2), respectively. The data sources 610(1) and 610(2) can generate encoded data 612 and 614, respectively. Due to the variation in data types and data formats, consumer device 616 can have difficulty querying the data sources 610(1) and 610(2). Instead, the encoded data 612 and 614 can be transmitted to the flexible tagging and searching system 108.

The flexible tagging and searching system 108 can generate encoded data 618 with the critical and/or non-critical tags. In some instances, the consumer device 616 can transmit a request 620 that can include a request tag and/or a request data item. Based on the request 620, the flexible tagging and searching system 108 can retrieve the encoded data 618 as requested by the consumer device 616 and transmit the encoded data 62 [to the consumer device 616.

Figure 7:
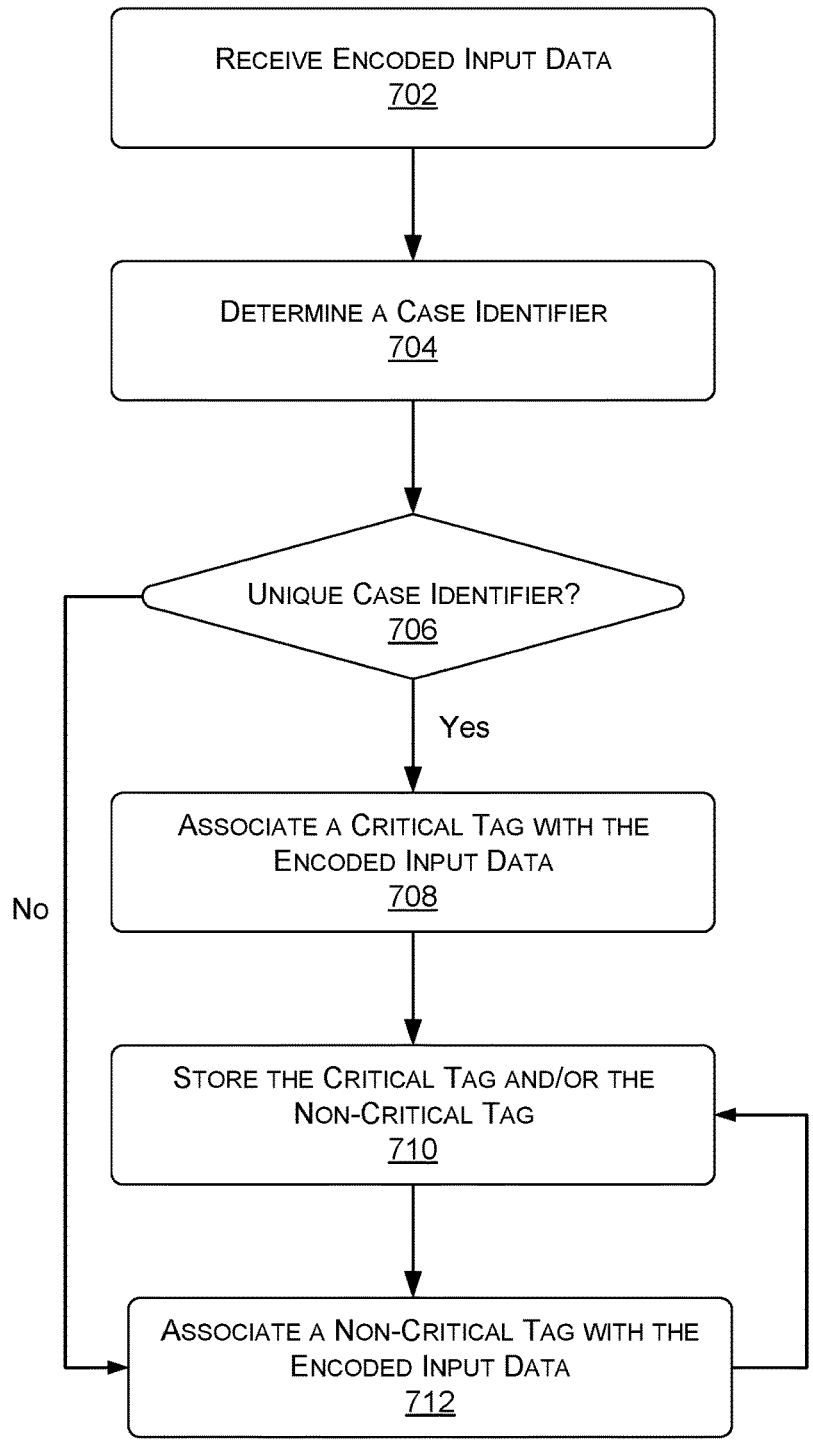
FIG. 7 is a flow diagram of an example process for associating critical and/or non-critical tags with encoded input data.

FIG. 7 is a flow diagram of an example process 700 for associating critical and/or non-critical tags with encoded input data. The example process 700 is described with reference to the computer architecture 200 of FIG. 2. Some portions of example process 700 can be omitted, replaced, and/or reordered while still providing the functionality of associating critical and/or non-critical tags with encoded input data.

At operation 702, the data input component 206 can receive the encoded input data from a data source. In some instances, the data source can transmit the encoded input data to the data input component 206. In some instances, the data input component can retrieve the encoded input data from the data source.

At operation 704, the data identifier component 208 can extract a data identifier from the encoded input data. As discussed above, in some instances, the data source can determine the data identifier and include the data identifier with the encoded input data. In some instances, the data input component 206 can determine the data identifier and include the data identifier with the encoded input data.

At operation 706, the comparison component 210 can determine whether the data identifier is unique. For example, the comparison component 210 can access a data database that stores a set of data identifiers and compare the data identifier to the set of data identifiers to determine whether the data identifier is unique. If the data identifier is unique, the example process 700 can proceed to operation 708 and if the data identifier is not unique, the example process 700 can proceed to operation 712.

At operation 708, the critical tag component 212 can associate a critical tag with the encoded input data. For example, the critical tag component 212 can access a configuration file associated with a user and/or a user service. The configuration file can indicate types of data that are critical for the user and/or the user service. Then, the critical tag component 212 can inspect the encoded input data and associate a critical tag with the encoded input data if it determines that the critical data types exist in the encoded input data.

At operation 710, the storage component 220 can transmit the critical tag data and/or the encoded input data for storage in a tag database.

As discussed above, the example process 700 can proceed to operation 712 if the comparison component 210 determines that the data identifier is not unique. The example process can also proceed to operation 712 after storing the tag data and/or the encoded input data in a tag database.

At operation 712, the non-critical tag component 216 can associate a non-critical tag with the encoded input data. For example, the non-critical tag component 216 can access the configuration file associated with the user and/or the user service. The configuration file can indicate types of data that are non-critical for the user and/or the user service. Then, the non-critical tag component 216 can inspect the encoded input data and associate a non-critical tag with the encoded input data if it determines that the non-critical data types exist in the encoded input data.

After completing operation 712, the example process 700 can return to operation 710 where the storage component 220 can transmit the non-critical tag data and/or the encoded input data for storage in the tag database.

Figure 8:
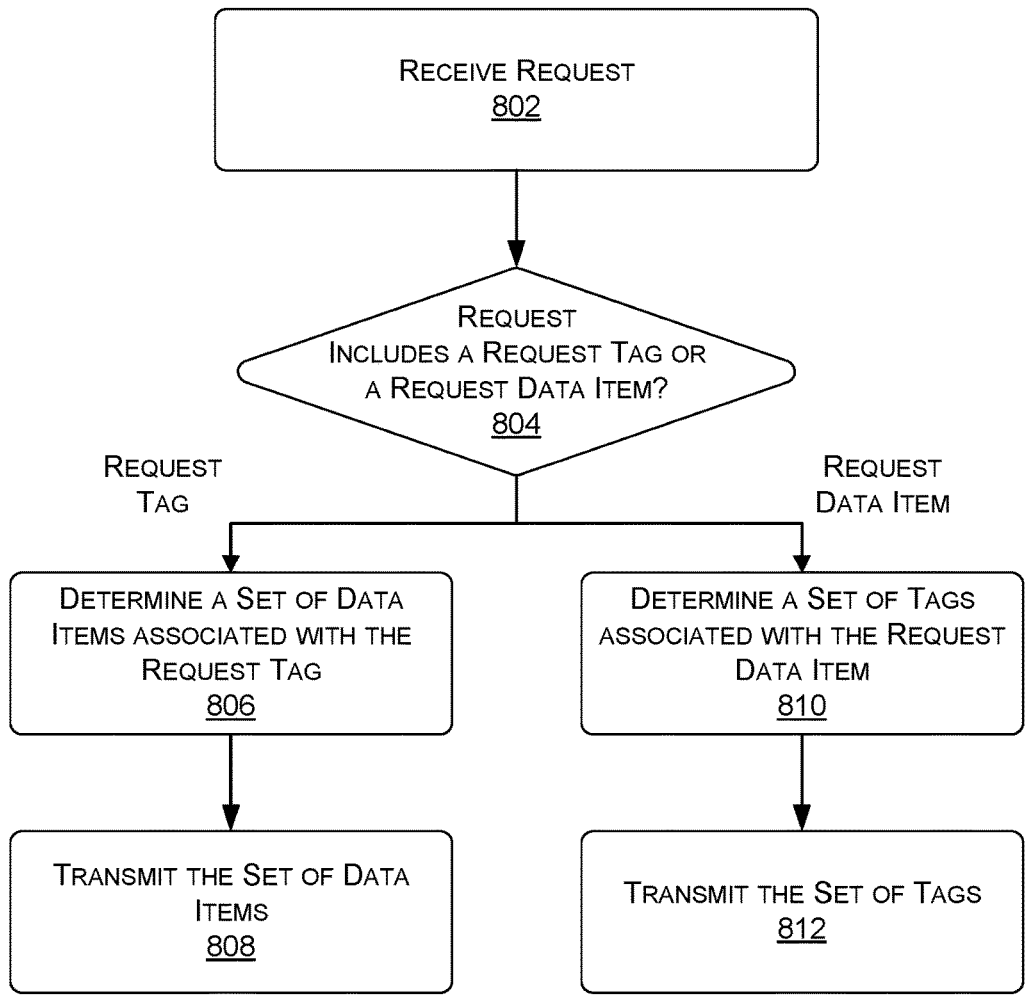
FIG. 8 is a flow diagram of an example process for receiving a request and transmitting a set of data items and/or a set of tags based on the request.

FIG. 8 is a flow diagram of an example process 800 for receiving a request and transmitting a set of data items and/or a set of tags based on the request. The example process 800 is described with reference to the computer architecture 200 of FIG. 2. Some portions of example process 800 can be omitted, replaced, and/or reordered while still providing the functionality of receiving a request and transmitting a set of data items and/or a set of tags based on the request At operation 802, the retrieval component 222 can receive a request. A consumer of the tagging system can submit the request to the tagging system.

At operation 804, the example process 800 can determine whether the request includes a request tag or a request data item. For example, the request can include a request tag where the consumer provides a request tag and the tagging system retrieves encoded data that is associated with the request tag. For purposes of illustration only, the request tag can be a language tag that indicates the English language.

In some instances, the request can include a request data item where the consumer provides a request data item and the tagging system retrieves tag data that is associated with the request data item. For purposes of illustration only, the request data item can be a user ID.

If the request includes a request tag, the example process 800 can proceed to operation 806 where the retrieval component 222 can determine a set of data items associated with the request tag. For example, the request can include a request tag and the retrieval component 222 can access a tag database and determine a set of data items that are associated with the request tag. As discussed above and for purposes of illustration only, the request tag can be a language tag that indicates the English language. Then, the retrieval component 222 can identify all of the encoded data that are associated with the language tag that indicates the English language as a set of data items.

At operation 808, the retrieval component 222 can transmit the set of data items to the consumer of the tagging system.

If the request includes a request data item, the example process 800 can proceed from operation 804 to operation to operation 810 where the retrieval component 222 can determine a set of tags associated with the request data item. For example, the request can include a request data item and the retrieval component 222 can access the tag database and/or a data source and determine a set of tags that are associated with the request data item. As discussed above and for purposes of illustration only, the request data item can be a user ID. Then the retrieval component 222 can identify all of the tags of encoded data that are associated with the user ID as the set of tags.

At operation 812, the retrieval component 222 can transmit the set of tags to the consumer of the tagging system.

Figure 9:
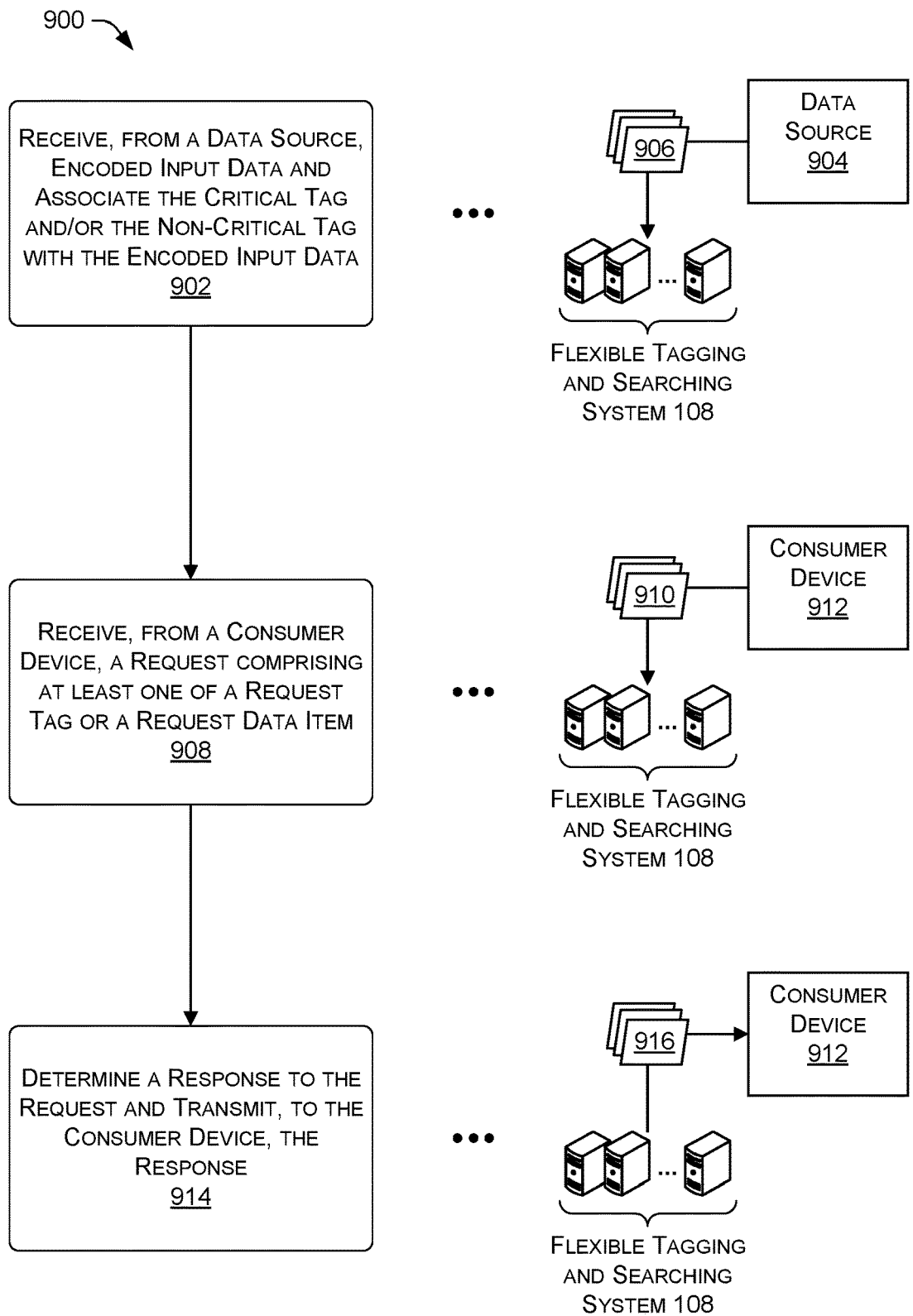
FIG. 9 is a pictorial flow diagram of an example process for receiving encoded input data, receiving a request, and determining a set of data items and/or a set of tags based on the request.

FIG. 9 is a pictorial flow diagram of an example process 900 for receiving encoded input data, receiving a request, and determining a set of data items and/or tags associated with the request and transmitting the set of data items and/or tags to a consumer device.

At operation 902, the tagging system 108 can receive, from a data source 904, encoded input data 906. As discussed above, the encoded input data 906 can include a user request and/or user activity data. The tagging system 108 can then initiate the critical tagging process and/or the non-critical tagging process to generate the tags and associate the tags with the encoded input data 906.

At operation 908, the tagging system 108 can receive a request 910 from a consumer device 912. As discussed above, the request can include a request tag indicating a request for data items associated with the request tag. In some instances, the request can include a data item indicating a request for tags associated with the data item.

At operation 914, the tagging system can determine a response 916 and transmit the response 916 to the consumer device 912. If the request 910 includes a request tag, the tagging system 108 can determine a set of data items associated with the request tag. For example, the request 910 can include a request tag and the tagging system 108 can determine a set of data items that are associated with the request tag. By way of example and without limitation, the request tag can be a language tag that indicates the English language. Then, the tagging system 108 can identify encoded data associated with the language tag that indicates the English language as a set of data items. Then, the response 916 can include the set of data items. If the request 910 includes a request data item, the tagging system 108 can determine a set of tags associated with the request data item. For example, the request 910 can include a request data item and tagging system 108 can determine a set of tags that are associated with the request data item. By way of example and without limitation, the request data item can be a user ID. Then the tagging system 108 can determine tags of the request data item associated with the user ID as the set of tags. Then the response 916 can include the set of tags.

Figure 10:
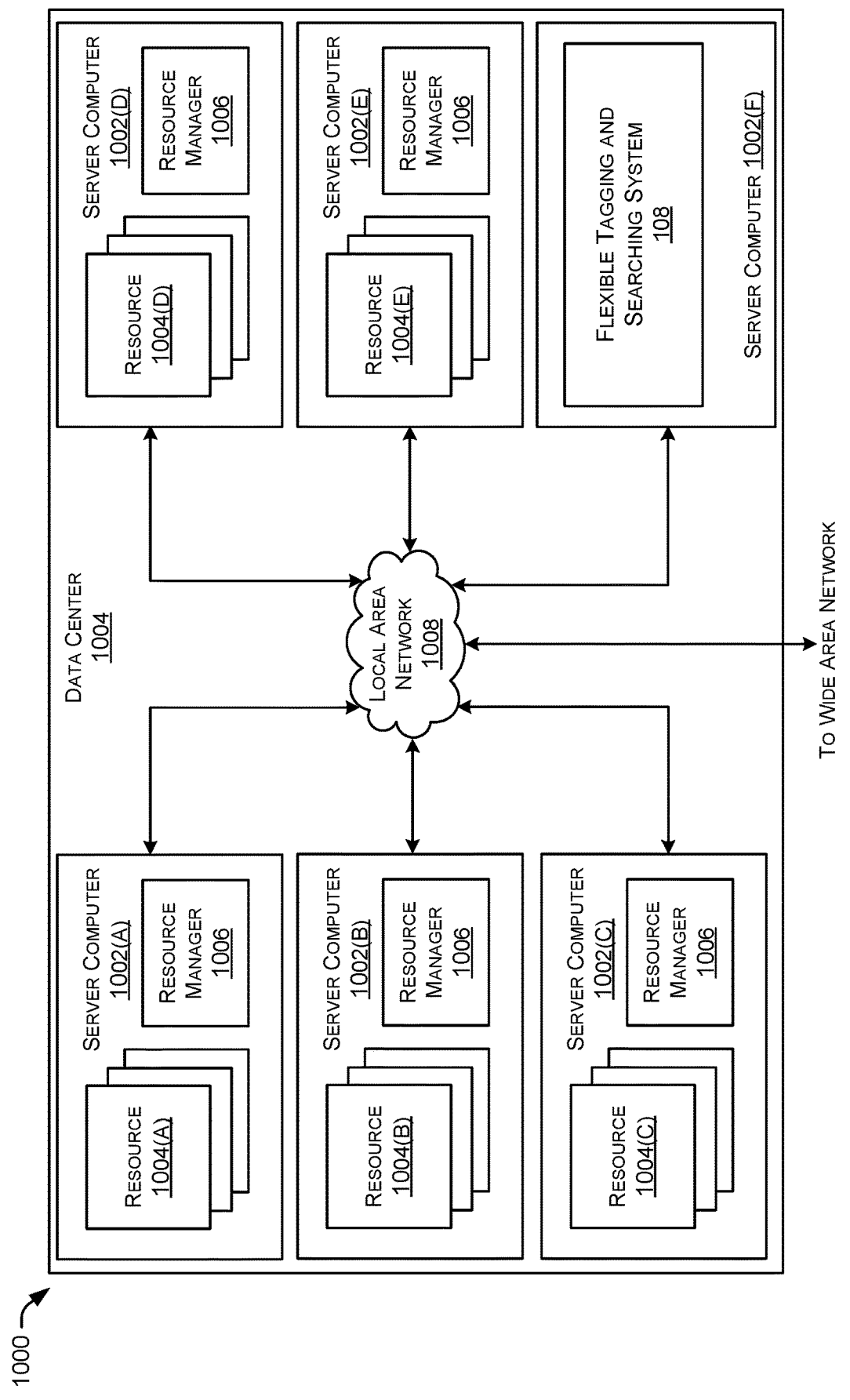
FIG. 10 is a computing system diagram illustrating a configuration for a data center that can be utilized to implement aspects of the technologies disclosed herein.

FIG. 10 is a computing system diagram 1000 illustrating a configuration for a data center 1004 that can be utilized to implement aspects of the technologies disclosed herein. The example data center 1004 shown in FIG. 10 includes several server computers 1002A-1002F (which might be referred to herein singularly as "a server computer 1002" or in the plural as "the server computers 1002") for providing computing resources 1004A-1004E.

The server computers 1002 can be standard tower, rack-mount, or blade server computers configured appropriately for providing the user services described herein. As mentioned above, the computing resources provided by the service-provider network can be data processing resources such as VM instances or hardware computing systems, database clusters, computing clusters, storage clusters, data storage resources, database resources, networking resources, and others. Some of the servers 1002 can also be configured to execute a resource manager 1006 capable of instantiating and/or managing the computing resources. In the case of VM instances, for example, the resource manager 1006 can be a hypervisor or another type of program configured to enable the execution of multiple VM instances on a single server computer 1002. Server computers 1002 in the data center 1004 can also be configured to provide network services and other types of services.

In the example data center 1004 shown in FIG. 10, an appropriate LAN 1008 is also utilized to interconnect the server computers 1002A-1002F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1004A-1004N, between each of the server computers 1002A-1002F in each data center 1004, and, potentially, between computing resources in each of the server computers 1002. It should be appreciated that the configuration of the data center 1004 described with reference to FIG. 10 is merely illustrative and that other implementations can be utilized. As shown, at least a portion of the flexible tagging and searching system 108 may be hosted by one or more server computers 1002 included in a data center 1004.

Figure 11:
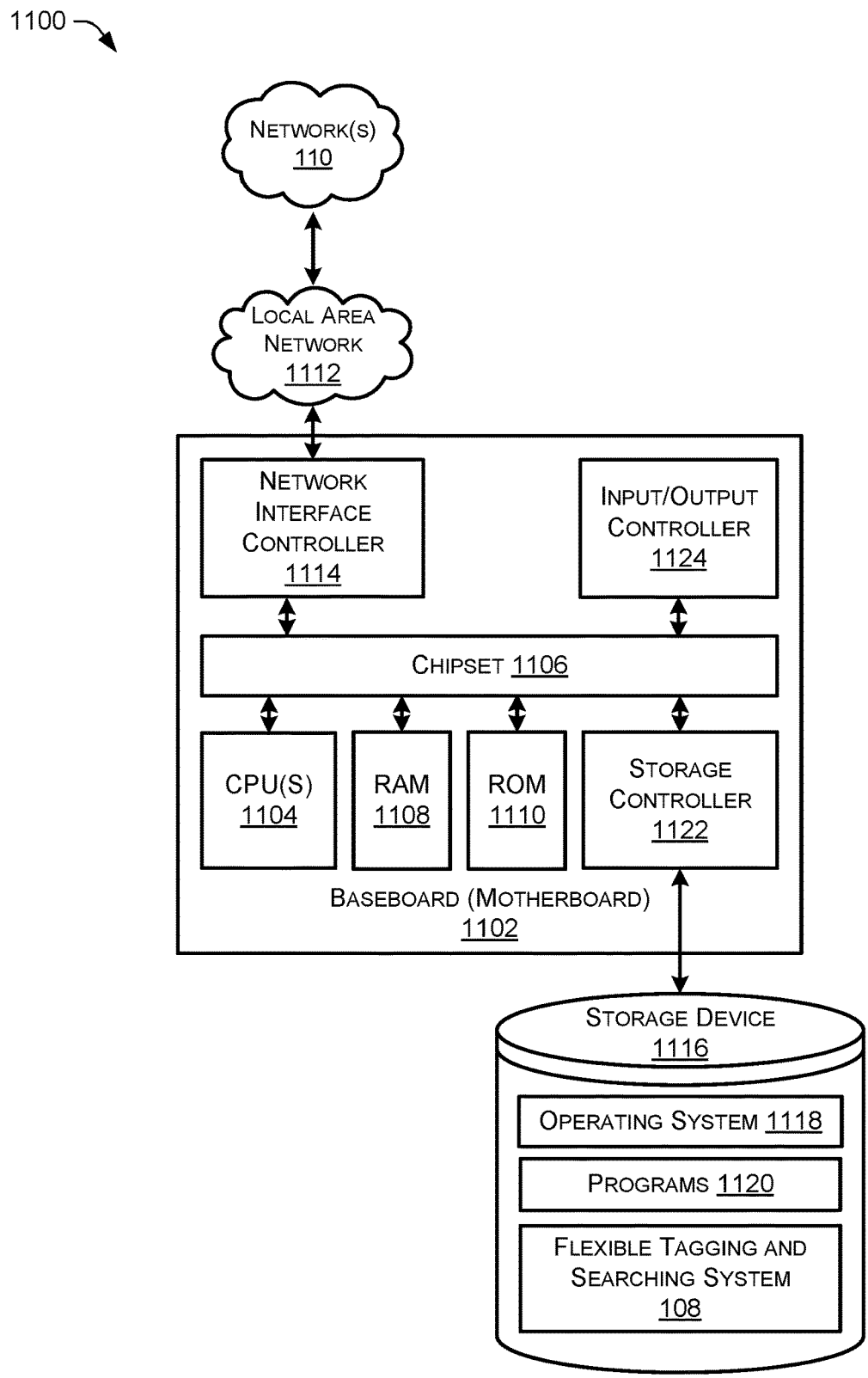
FIG. 11 is a computer architecture diagram showing an illustrative computer hardware architecture for implementing a computing device that can be utilized to implement aspects of the various technologies presented herein.

FIG. 11 shows an example computer architecture for a computer 1100 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein.

The computer 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network, such as the network 1112. The chipset 1106 can include functionality for providing network connectivity through a NIC 1114, such as a gigabit Ethernet adapter. The NIC 1114 is capable of connecting the computer 1100 to other computing devices over the network 1112. It should be appreciated that multiple NICs 1114 can be present in the computer 1100, connecting the computer to other types of networks and remote computer systems.

The computer 1100 can be connected to a mass storage device 1116 that provides non-volatile storage for the computer. The mass storage device 1116 can store an operating system 1118, programs 1120, and data, which have been described in greater detail herein. The mass storage device 1116 can be connected to the computer 1100 through a storage controller 1122 connected to the chipset 1106. The mass storage device 1116 can consist of one or more physical storage units. The storage controller 1122 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 can store data on the mass storage device 1116 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1116 is characterized as primary or secondary storage, and the like.

For example, the computer 1100 can store information to the mass storage device 1116 by issuing instructions through the storage controller 1122 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the mass storage device 1116 by detecting the physical states or characteristics of one or more particular locations within the physical storage units.

In addition to the mass storage device 1116 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100. In some examples, the operations performed by the flexible tagging and searching system 108, and or any components included therein, may be supported by one or more devices similar to computer 1100.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1116 can store an operating system 1118 utilized to control the operation of the computer 1100. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1116 can store other system or application programs and data utilized by the computer 1100.

In one embodiment, the mass storage device 1116 or other computer-readable storage media is encoded with computer-executable instructions which, when loaded into the computer 1100, transform the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various processes described above with regard to FIGS. 1-9. The computer 1100 can also include computer-readable storage media having instructions stored thereupon for performing any of the other computer-implemented operations described herein.

The computer 1100 can also include one or more input/output controllers 1124 for receiving and processing input from a number of input devices, such as a keyboard, a mouse, a touchpad, a touch screen, an electronic stylus, or other type of input device. Similarly, an input/output controller 1124 can provide output to a display, such as a computer monitor, a flat-panel display, a digital projector, a printer, or other type of output device. It will be appreciated that the computer 1100 might not include all of the components shown in FIG. 11, can include other components that are not explicitly shown in FIG. 11, or might utilize an architecture completely different than that shown in FIG. 11.

Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system comprising:
one or more processors; and
one or more computer readable media storing computer executable instructions that, when executed, cause the one or more processors to perform operations comprising:
receiving, from a data source of a plurality of data sources, JavaScript Object Notation (JSON) encoded input data;
determining, based on the JSON encoded input data, a data identifier that associates the JSON encoded input data with a user case;
comparing the data identifier to a plurality of data identifiers stored in a user data database;
determining, based on comparing the data identifier to the plurality of data identifiers, that the data identifier is unique;
determining a computational resources consumption amount to associate a plurality of critical tags and a plurality of non-critical tags with the JSON encoded input data;
comparing the computational resources consumption amount to a computational resources consumption threshold;
determining, based at least in part on the computational resources consumption amount failing to meet or exceed the computational resources consumption threshold, a schedule for associating the plurality of critical tags or the plurality of non-critical tags with the JSON encoded input data;
associating, prior to associating the plurality of non-critical tags with the JSON encoded input data, based on the schedule, and based on determining that the data identifier is unique, a critical tag of the plurality of critical tags with the JSON encoded input data, wherein the critical tag indicates that the JSON encoded input data satisfies a data threshold for further processing, wherein a portion of the JSON encoded input data determined to be defective is discarded and not tagged, and further wherein the plurality of critical tags comprise:
a first support department tag associated with a first region indicating that a first support department associated with the first region is authorized to manage the user case; or
a second support department tag associated with a second region indicating that a second support department associated with the second region is authorized to manage the user case;
storing, in a key value database, the critical tag; and
associating, after associating the critical tag with the JSON encoded input data, a non-critical tag of the plurality of non-critical tags with the JSON encoded input data, the plurality of non-critical tags comprising:
a priority tag indicating a priority associated with the user case; or
a support experience tag indicating an experience level associated with at least one of the first support department or the second support department.

2. The system as recited in claim 1, the operations further comprising:
determining, based on the data identifier, a user identifier associated with the user case; and
determining, based on the user identifier, a plurality of user rules associated with the user identifier, wherein the plurality of user rules defines the plurality of critical tags and the plurality of non-critical tags.

3. The system as recited in claim 1, the operations further comprising:
   determining a critical tag time threshold that indicates a threshold amount of time to associate the critical tag with the JSON encoded input data;
   determining a duration of time since receiving the JSON encoded input data; and
   determining that the duration of time is less than or equal to the critical tag time threshold, wherein associating the critical tag is based on determining that the duration of time is less than or equal to the critical tag time threshold.

4. The system as recited in claim 1, the operations further comprising;
   determining a failure relating to associating the critical tag with the JSON encoded input data; and
   discarding, based on determining the failure, the JSON encoded input data.

5. The system as recited in claim 1, wherein receiving the JSON encoded input data is based on a network congestion associated with the system and the data source being equal to or below a network congestion threshold.

6. A method comprising:
   determining encoded input data;
   determining, based at least in part on the encoded input data, a data identifier that associates the encoded input data with a user activity data of a set of user activity data;
   comparing the data identifier to a set of data identifiers, wherein an individual data identifier of the set of data identifiers uniquely identifies an individual user activity data of the set of user activity data;
   determining, based at least in part on comparing the data identifier to the set of data identifiers, that the data identifier is unique;
      determining a computational resources consumption amount to initiate one or more of a priority tagging process or a non-priority tagging process;
      comparing the computational resources consumption amount to a computational resources consumption threshold;
      determining, based at least in part on the computational resources consumption amount failing to meet or exceed the computational resources consumption threshold, a schedule for initiating the one or more of the priority tagging process or the non-priority tagging process;
   initiating, based at least in part on determining that the data identifier is unique and the schedule, the priority tagging process, the priority tagging process comprising:
      determining a priority tag that indicates that the encoded input data satisfies a data threshold for further processing;
      associating the priority tag with at least a first portion of the encoded input data;
      determining that at least a portion of the encoded input data is defective; and
      discarding the at least the portion of the encoded input data based at least in part on the at least the portion of the encoded input data being defective; and
   initiating the non-priority tagging process, the non-priority tagging process comprising:
      determining a non-priority tag; and
      associating the non-priority tag with at least a second portion of the encoded input data.

7. The method as recited in claim 6, wherein determining the encoded input data comprises receiving the encoded input data from a data source, wherein the encoded input data includes a user request, wherein the priority tagging process occurs synchronously with receiving the encoded input data such that a completion of the priority tagging process occurs prior to performing an operation responsive to the user request, and such that defective user requests are not processed, and wherein the non-priority tagging process occurs asynchronously with receiving the encoded input data.

8. The method as recited in claim 6, further comprising:
   determining a markup type associated with the encoded input data; and
   determining, based at least in part on the markup type, a syntax verification associated with the encoded input data,
   wherein determining the data identifier is based at least in part on the syntax verification.

9. The method as recited in claim 6, further comprising:
   determining that the priority tagging process has failed;
   preventing a storage of the priority tag in a key value database; and
   discarding at least one of the encoded input data or the data identifier.

10. The method as recited in claim 6, further comprising:
    determining, based at least in part on the data identifier, a user identifier associated with the user activity data; and
    determining, based at least in part on the user identifier, a set of user rules associated with the user identifier, wherein the set of user rules defines a set of priority tags that comprises the priority tag and a set of non-priority tags that comprises the non-priority tag.

11. The method as recited in claim 6, further comprising:
    determining a priority tag time threshold that indicates a threshold amount of time to associate the priority tag with the encoded input data;
    determining a duration of time since receiving the encoded input data; and
    determining that the duration of time is less than or equal to the priority tag time threshold, wherein associating the priority tag is based on determining that the duration of time is less than or equal to the priority tag time threshold.

12. The method as recited in claim 6, further comprising:
    determining an input time associated with the encoded input data;
    determining, based at least in part on the input time, an expiration time associated with the encoded input data;
    determining that a current time is equal or subsequent to the expiration time; and
    discarding, based at least in part on the current time being equal or subsequent to the expiration time, the encoded input data.

13. A system comprising:
    one or more processors; and
    one or more computer readable media storing computer executable instructions that, when executed, cause the one or more processors to perform operations comprising:
       determining user data;
       determining, based at least in part on the user data, an identifier that associates the user data with a user;
       determining a computational resources consumption amount to complete one or more of a critical tagging process or a non-critical tagging process;

comparing the computational resources consumption amount to a computational resources consumption threshold;

determining, based at least in part on the computational resources consumption amount failing to meet or exceed the computational resources consumption threshold, a schedule for initiating the one or more of the critical tagging process or the non-critical tagging process;

initiating, based at least in part on the schedule, the critical tagging process and the non-critical tagging process, wherein initiating the critical tagging process comprises, in a synchronous manner as the user data is received and prior to initiating the non-critical tagging process:

determining a critical tag;

associating the critical tag with at least a first portion of the user data that is determined to be non-defective; and discarding a second portion of the user data that is determined to be defective, and wherein initiating the non-critical tagging process comprises, after completion of the critical tagging process:

determining a non-critical tag; and associating the non-critical tag with at least a third portion of the user data.

14. The system as recited in claim 13, the operations further comprising:

receiving a request that comprises at least one of a request tag or a request data item; and determining, based at least in part on the request, a set of request results that comprises at least one of the user data associated with the request tag or tag data associated with the request data item.

15. The system as recited in claim 13, the operations further comprising:

determining that at least one of the critical tagging process or the non-critical tagging process is complete; and storing, based at least in part on determining that at least one of the critical tagging process or the non-critical tagging process is complete, at least one of the critical tag or the non-critical tag in a tag database.

16. The system as recited in claim 13, the operations further comprising:

determining that the critical tagging process has failed;

preventing a storage of the critical tag in a tag database; and discarding the user data.

17. The system as recited in claim 13, wherein the non-critical tagging process is a first non-critical tagging process, the operations further comprising:

determining that the first non-critical tagging process has failed; and initiating, based at least in part on determining that the first non-critical tagging process has failed, a second non-critical tagging process with respect to the user data.

18. The system as recited in claim 13, the operations further comprising:

determining, based at least in part on the identifier, a user identifier; and determining, based at least in part on the user identifier, a set of user rules associated with the user identifier, wherein the set of user rules defines a set of critical tags that comprises the critical tag and a set of non-critical tags that comprises the non-critical tag.

19. The system as recited in claim 13, the operations further comprising:

determining a critical tag time threshold that indicates a threshold amount of time to associate the critical tag with the user data;

determining a duration of time since receiving the user data; and determining that the duration of time is less than or equal to the critical tag time threshold, wherein associating the critical tag is based on determining that the duration of time is less than or equal to the critical tag time threshold.

20. The system as recited in claim 13, the operations further comprising:

determining an input time associated with the user data;

determining, based at least in part on the input time, an expiration time associated with the user data;

determining that a current time is equal or subsequent to the expiration time; and discarding, based at least in part on the current time being equal or subsequent to the expiration time, the user data.

* * * * *